(12) United States Patent
Matsui

(10) Patent No.: US 11,079,986 B2
(45) Date of Patent: Aug. 3, 2021

(54) PRINTING APPARATUS HAVING PRINT SETTING CONTROL, METHOD OF CONTROLLING THE SAME, AND COMPUTER-READABLE STORAGE MEDIUM

(71) Applicant: CANON KABUSHIKI KAISHA, Tokyo (JP)

(72) Inventor: Kenta Matsui, Moriya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/284,360

(22) Filed: Feb. 25, 2019

(65) Prior Publication Data

US 2019/0272131 A1   Sep. 5, 2019

(30) Foreign Application Priority Data

Mar. 5, 2018   (JP) .............................. JP2018-038966

(51) Int. Cl.
*G06F 3/12*   (2006.01)

(52) U.S. Cl.
CPC .......... *G06F 3/1254* (2013.01); *G06F 3/1204* (2013.01); *G06F 3/1287* (2013.01); *G06F 3/1292* (2013.01); *G06F 3/1228* (2013.01); *G06F 3/1257* (2013.01)

(58) Field of Classification Search
CPC .... G06F 3/1228; G06F 3/1292; G06F 3/1254; G06F 3/1257; H04N 1/00477
See application file for complete search history.

(56) References Cited

U.S. PATENT DOCUMENTS

| | | | |
|---|---|---|---|
| 9,183,477 B2 | 11/2015 | Sako | |
| 2010/0259783 A1* | 10/2010 | Matsuzawa | H04N 1/00244 358/1.15 |
| 2011/0141518 A1* | 6/2011 | Kayama | G06F 3/1211 358/1.15 |
| 2011/0273738 A1* | 11/2011 | Tanaka | H04N 1/0097 358/1.14 |
| 2012/0147420 A1* | 6/2012 | Nishimi | G06F 3/1204 358/1.15 |
| 2012/0200882 A1* | 8/2012 | Ito | G06F 3/1205 358/1.15 |
| 2012/0250072 A1* | 10/2012 | Miller | G06F 3/1205 358/1.15 |
| 2013/0100486 A1* | 4/2013 | Mccoog | G06F 3/1204 358/1.15 |
| 2013/0286425 A1* | 10/2013 | Nakamura | G06K 15/1806 358/1.13 |

(Continued)

FOREIGN PATENT DOCUMENTS

JP        2014-164420 A       9/2014

*Primary Examiner* — Nicholas Pachol
(74) *Attorney, Agent, or Firm* — Venable LLP

(57) ABSTRACT

A printing apparatus stores a print setting set by a user in a storage, and receives print data from an external apparatus, determines, based on the received print data, that the stored print setting is applied to the received print data, and receives a designation of a print setting to be applied to the received print data to which the stored print setting is determined to be applied. An image is printed based on the received print data using the stored print setting changed by the received designation.

18 Claims, 11 Drawing Sheets

(56) References Cited

U.S. PATENT DOCUMENTS

| | | | |
|---|---|---|---|
| 2015/0261480 A1* | 9/2015 | Omura | G06F 3/1231 358/1.13 |
| 2015/0339561 A1* | 11/2015 | Takenaka | G06F 1/00 358/1.14 |
| 2016/0092144 A1* | 3/2016 | Sato | G06F 3/1257 358/1.13 |
| 2016/0378408 A1* | 12/2016 | Asano | G06F 3/1205 358/1.15 |
| 2018/0210379 A1* | 7/2018 | Kikuchi | G03G 15/2039 |
| 2018/0237240 A1* | 8/2018 | Sugimoto | B65H 1/04 |
| 2019/0026055 A1* | 1/2019 | Nishida | G06F 3/0412 |

* cited by examiner

FIG. 5A

DEDICATED DRIVER PRINTING

| PRINT SETTING | VALUE |
|---|---|
| 501a — ITEM A (DUPLEX PRINTING) | ON |
| 502a — ITEM B (TONER ECONOMIZATION) | OFF |
| 503a — ITEM C (FOLDING SETTING) | ON |

FIG. 5B

MOBILE PRINTING

| PRINT SETTING | VALUE |
|---|---|
| 501b — ITEM A (DUPLEX PRINTING) | ON |
| 502b — ITEM B (TONER ECONOMIZATION) | – |
| 503b — ITEM C (FOLDING SETTING) | – |

FIG. 5C

GENERAL-PURPOSE DRIVER PRINTING

| PRINT SETTING | VALUE |
|---|---|
| 501c — ITEM A (DUPLEX PRINTING) | ON |
| 502c — ITEM B (TONER ECONOMIZATION) | OFF |
| 503c — ITEM C (FOLDING SETTING) | – |

FIG. 6A

PRINT SETTING INFORMATION

| PRINT SETTING | VALUE | COMPLEMENTING FLAG |
|---|---|---|
| 601a — ITEM A (DUPLEX PRINTING) | ON | no |
| 602a — ITEM B (TONER ECONOMIZATION) | OFF | yes |
| 603a — ITEM C (FOLDING SETTING) | OFF | yes |

FIG. 6B

SPECIFIC PRINT SETTING INFORMATION FOR MOBILE PRINTING

| PRINT SETTING | VALUE |
|---|---|
| 601b — ITEM A (DUPLEX PRINTING) | — |
| 602b — ITEM B (TONER ECONOMIZATION) | — |
| 603b — ITEM C (FOLDING SETTING) | ON |

FIG. 7A

PRINT SETTING INFORMATION

| PRINT SETTING | VALUE | COMPLEMENTING FLAG |
|---|---|---|
| 701a — ITEM A (DUPLEX PRINTING) | ON | no |
| 702a — ITEM B (TONER ECONOMIZATION) | OFF | no |
| 703a — ITEM C (FOLDING SETTING) | OFF | yes |

FIG. 7B

SPECIFIC PRINT SETTING INFORMATION FOR GENERAL-PURPOSE DRIVER PRINTING

| PRINT SETTING | VALUE |
|---|---|
| 701b — ITEM A (DUPLEX PRINTING) | — |
| 702b — ITEM B (TONER ECONOMIZATION) | — |
| 703b — ITEM C (FOLDING SETTING) | ON |

FIG. 10A

SHEET SIZE
[ A4 ▼ ]

SIMPLEX/DUPLEX
[ DUPLEX PRINTING ▼ ]

TONER ECONOMIZATION
[ DO ▼ ]

FOLDING SETTING
[ Z FOLD ▼ ]

FIG. 10B

SHEET SIZE
[ A4 ▼ ]

SIMPLEX/DUPLEX
[ DUPLEX PRINTING ▼ ]

FIG. 10C

SHEET SIZE
[ A4 ▼ ]

SIMPLEX/DUPLEX
[ DUPLEX PRINTING ▼ ]

TONER ECONOMIZATION AT TIME OF PRINTING
[ DO NOT ▼ ]

PRINTING APPARATUS HAVING PRINT SETTING CONTROL, METHOD OF CONTROLLING THE SAME, AND COMPUTER-READABLE STORAGE MEDIUM

BACKGROUND OF THE INVENTION

Field of the Invention

The present invention relates to a printing apparatus that supports printing from a mobile terminal, a method of controlling the printing apparatus, and a storage medium.

Description of the Related Art

In recent years, mobile printing where a mobile terminal transmits print data to a printer to perform printing has been commonly performed, as with Mopria or Google Cloud Print. At a time of printing, a user can set a print setting, such as "color print" or "monochrome print", with respect to print data. In such mobile printing, because a user can perform a print setting without being aware of the capabilities of individual printers, only print setting items that are supported by all printers can be set. In other words, in comparison to items that can be set in a printing apparatus, items that can be set from a mobile terminal in mobile printing are substantially limited.

Japanese Patent Laid-Open No. 2014-164420 recites a technique for, when a printer receives print data for mobile printing, printing that print data based on a print setting registered in the printer in advance by a user.

However, there is a problem as is recited below in the foregoing conventional technique. For example, in the conventional technique described above, printing is executed based on a print setting registered beforehand in a printer by a user, or a print setting included in print data, in accordance with whether this is mobile printing. However, when printing is performed based on a print setting registered beforehand in a printer by a user, it is not possible to change the setting on a job-by-job basis via a mobile terminal, it is necessary to re-register to make a change, and this is cumbersome for the user. In addition, when printing based on a print setting included in print data at a time of mobile printing is performed, limitations for the setting items arise, as described above.

However, by installing a printer driver in a mobile terminal or using a printer driver installed in the mobile terminal in advance, a user can, on the mobile terminal, set a print setting for print data similarly to with a UI of a printer. However, in this case, current circumstances are that consideration has not been given how to handle a print setting set in a mobile terminal and a print setting set at a printer. In addition, a printer driver has a large program size in comparison to a mobile printing application, and it is necessary to install a printer driver for each product because each printer driver is specific to a respective product, and is not suitable for the restricted memory environment of the mobile terminal. Note that, in the case of printing that uses a general-purpose driver installed on a PC or the like, it is possible to perform a print setting for a plurality of products, but there are similar problems as that of a mobile printing application.

SUMMARY OF THE INVENTION

The present invention enables realization of a mechanism for suitably selecting, for each print setting item, between a print setting item set via an external terminal and a print setting item defined in advance, while suppressing consumption of memory resources in the external terminal.

One aspect of the present invention provides a printing apparatus, comprising: a memory device that stores a set of instructions; and at least one processor that executes the set of instructions to: receive print data including a first print setting from an external apparatus; for the received print data, determine a print type from a parameter relating to the reception; acquire a second print setting that is a specific print setting corresponding to the determined print type; and for each setting item, execute print processing using the print data, in accordance with one of the first print setting included in the received print data and the acquired second print setting.

Another aspect of the present invention provides a method of controlling a printing apparatus, the method comprising: receiving print data including a first print setting from an external apparatus; for the received print data, determining a print type from a parameter relating to the reception; acquiring a second print setting that is a specific print setting corresponding to the determined print type; and for each setting item, executing print processing using the print data, in accordance with one of the first print setting included in the received print data and the acquired second print setting.

Still another aspect of the present invention provides a non-transitory computer-readable storage medium storing a computer program for causing a computer to execute a method of controlling a printing apparatus, the method comprising: receiving print data including a first print setting from an external apparatus; for the received print data, determining a print type from a parameter relating to the reception; acquiring a second print setting that is a specific print setting corresponding to the determined print type; and for each setting item, executing print processing using the print data, in accordance with one of the first print setting included in the received print data and the acquired second print setting.

Further features of the present invention will be apparent from the following description of exemplary embodiments with reference to the attached drawings.

BRIEF DESCRIPTION OF THE DRAWINGS

FIGS. 5A-5C illustrate an example of print settings set in print data according to an embodiment.

FIGS. 6A and 6B illustrate print setting information and specific print setting information according to an embodiment.

FIGS. 7A and 7B illustrate print setting information and specific print setting information according to an embodiment.

FIGS. 10A-10C illustrate an example of a print setting screen according to an embodiment.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Hardware Configuration of Printing Apparatus 22

Figure 1:
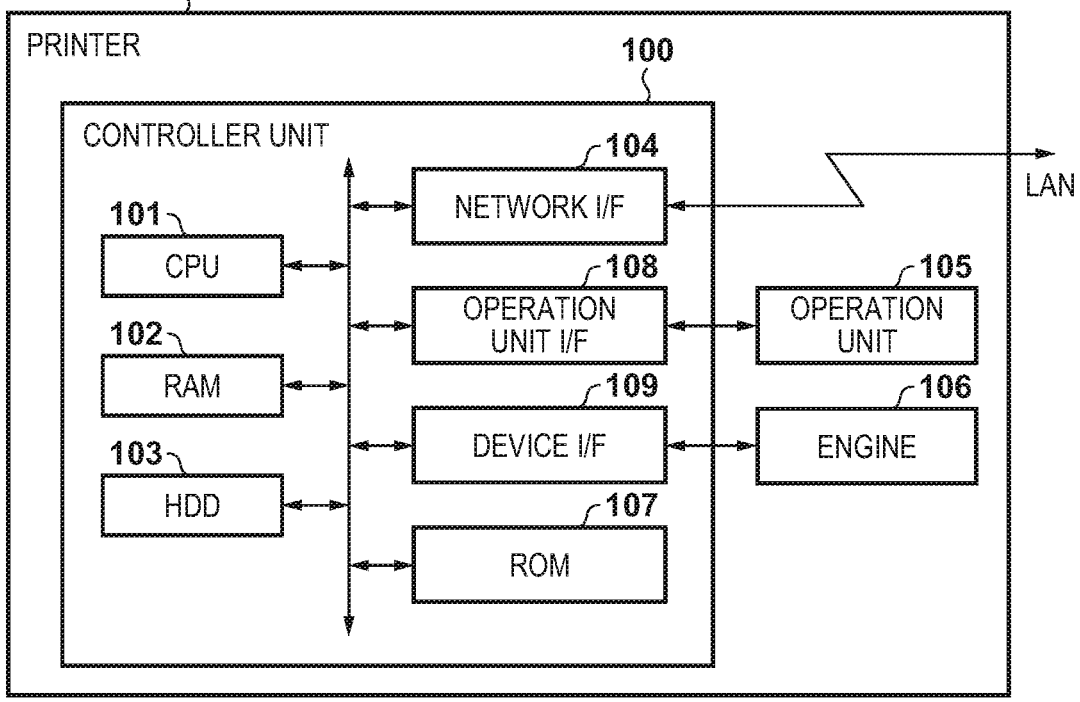
FIG. 1 illustrates a hardware configuration of a printing apparatus according to an embodiment.

Below, description will be given for a first embodiment of the present invention. Firstly, with reference to FIG. 1, description is given for a hardware configuration of a printer 10 which is a printing apparatus according to the present embodiment.

The printer 10 is provided with a controller unit 100, an operation unit 105, and an engine 106. In addition, the controller unit 100 is provided with a CPU 101, a RAM 102, an HDD 103, a network I/F (interface) 104, a ROM 107, an operation unit I/F 108, and a device I/F 109.

Figure 2:
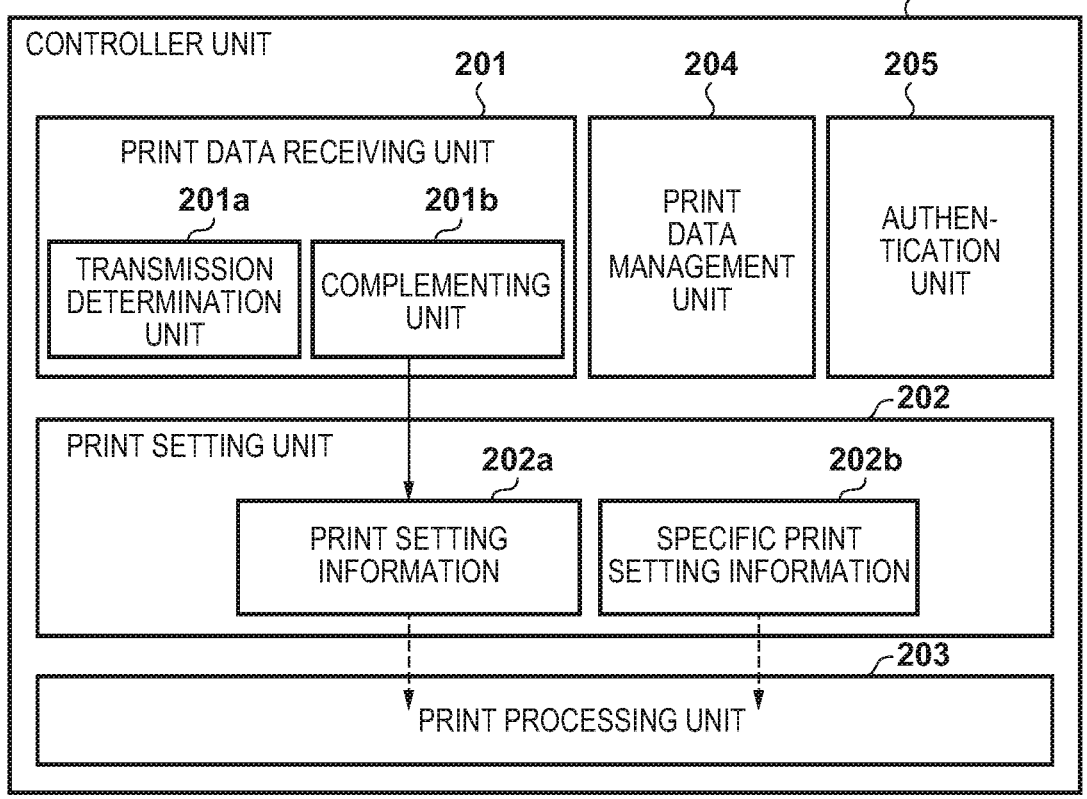
FIG. 2 illustrates a software configuration of the printing apparatus according to an embodiment.

The CPU 101 is a CPU (Central Processing Unit) for comprehensively controlling the printer 10. Software modules described later by FIG. 2 all operate on the CPU. The RAM 102 is a RAM (Random Access Memory) that the CPU 101 can access. The RAM 102 is used as a place for reserving memory necessary for operation of various software, and a save destination for a print image generated from print data. The ROM 107 is a ROM (Read Only Memory). A software module described later by FIG. 2 is stored here, and read out and executed by the CPU 101.

The network I/F 104 is connected to a network such as a LAN by an NIC (Network Interface Card) that can receive print data. The HDD 103 is an HDD (Hard Disk Drive) that can store and accumulate received print data. The operation unit 105 is hardware such as an operation panel that can accept a request to change a print setting, a request to print print data, and user authentication. The operation unit I/F 108 is an I/F for connecting the operation unit 105 and the controller unit 100.

The engine 106 is an engine for outputting a print image generated by a result of print processing by a print processing unit 203, which is described later, to a print sheet. The device I/F 109 is an I/F for connecting the engine 106 and the controller unit 100, and for controlling the engine 106.

<Software Configuration of Printing Apparatus>

Next, with reference to FIG. 2, description is given for an example of a module configuration of software modules that operate on the controller unit 100 according to the present embodiment. As a software configuration, the controller unit 100 is provided with a print data receiving unit 201, a print setting unit 202, the print processing unit 203, a print data management unit 204, and an authentication unit 205.

The print data receiving unit 201 is a software module for receiving print data from an external apparatus via the network I/F 104. The print data receiving unit 201 includes a transmission determination unit 201a that can determine a print type of print data, and a complementing unit 201b for reflecting a print setting for print data to print setting information 202a which is described later, while complementing the print setting. Details of the transmission determination unit 201a and the complementing unit 201b are described later using the flowcharts of FIGS. 4A and 4B.

The print setting unit 202 is a software module for reflecting a print setting to print setting information (a first print setting) 202a and specific print setting information (a second print setting) 202b, which relate to a print setting set via the operation unit 105 or a print setting included print data received from the external apparatus. Details of the print setting reflection method are described later using the flowcharts of FIGS. 4A and 4B.

The print processing unit 203 is a software module for performing print processing for generating a print image from print data. When print processing is performed, the print processing unit 203 refers to the print setting information 202a and the specific print setting information 202b. Details of the reference method are described later using the flowcharts of FIGS. 4A and 4B.

The authentication unit 205 is a software module for performing user authentication. The print data management unit 204 is a software module for managing print data received by the print data receiving unit 201, and outputting print data of a user who has been authenticated by the authentication unit 205.

<Mobile Printing Sequence>

Figure 3:
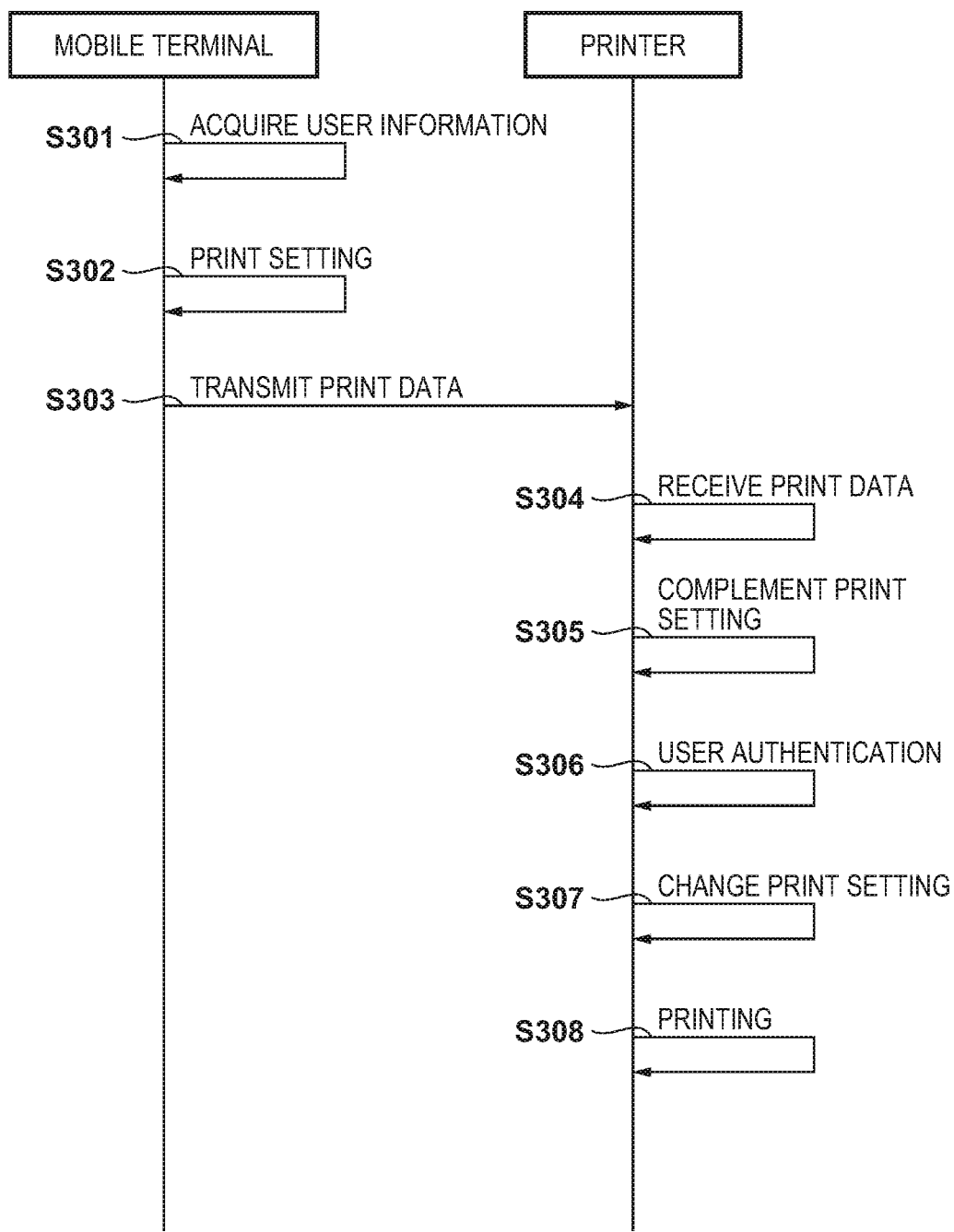
FIG. 3 illustrates an overall sequence of the printing apparatus according to an embodiment.

Next, with reference to FIG. 3, description is given for a sequence illustrating an overall flow in mobile printing according to the present embodiment.

In step S301, the mobile terminal acquires user information that can be used in authentication for the printer 10 by user input, for example. In step S302, the mobile terminal performs a print setting. An actual print setting is performed by a printer driver, which is installed on a mobile terminal by a user. Next, in step S303, the mobile terminal transmits print data to the printer 10. The print data includes user information acquired in step S301 or a print setting set in step S302.

Next, in step S304, the printer 10 receives the print data transmitted from a mobile terminal. Next, in step S305, the printer 10 complements a print setting based on the print setting included in the print data.

Description is given here regarding the processing for complementing. In conventional PC printing, a dedicated driver for the printer 10 which is a print destination is installed on the PC, and a user can optionally set all print setting items. FIG. 5A is a conceptual view of print settings included in print data generated by the dedicated driver. There are three print setting items that can be set on or off: an item A (reference numeral 501a), an item B (reference numeral 502a), and an item C (reference numeral 503a), and a user can optionally set all of them by the dedicated driver. Here, the item A is a double-sided print setting, the item B is a toner economization setting, and the item C is a folding setting.

In contrast, in mobile printing, detailed print settings as with a dedicated driver for a printer is not supported, and a user can only set limited print setting items. FIG. 5B is a conceptual view of print settings included in print data generated by mobile printing. The print setting item present in the print data is only the item A (reference numeral 501b), and the item B (reference numeral 502b) and the item C (reference numeral 503b) cannot be set by a user in mobile printing in the mobile terminal.

FIGS. 10A and 10B respectively illustrate examples of a print setting screen for a dedicated driver and a print setting screen for a mobile terminal. It is possible to set one of "sheet size" or "simplex/duplex printing" (simplex printing=OFF, duplex printing=ON), which are basic print settings. However, an optional print setting "toner economization" (do not economize=OFF, and economize=ON) for suppressing a toner usage amount at a time of printing, or a special print setting "folding setting" (do not fold=OFF, and fold=ON) for optionally folding an output sheet by a dedicated device cannot be set by the mobile terminal.

However, for the printer 10 to execute print processing on print data, the information for the items B and C set by the dedicated driver are also necessary. Accordingly, in the case of a print setting item lacking in print data for mobile printing, the printer 10 performs processing for complementing for the information of the print setting item by the printer itself. This is the processing for complementing a print setting that is performed in step S305. In the present embodiment, the items B and C of FIG. 5B are complemented by the predetermined value "OFF". Details of processing for complementing are described later using the flowcharts of FIGS. 4A and 4B.

The description of FIG. 3 is returned to. In step S306, the printer 10 performs user authentication. Next, in step S307, the printer 10 changes a print setting for the print data in accordance with, for example, a change request from a user. Furthermore, in step S308, the printer 10 prints the print data in accordance with the print settings at that point, and this sequence ends.

<Processing Procedure for the Printer>

Figure 4A:
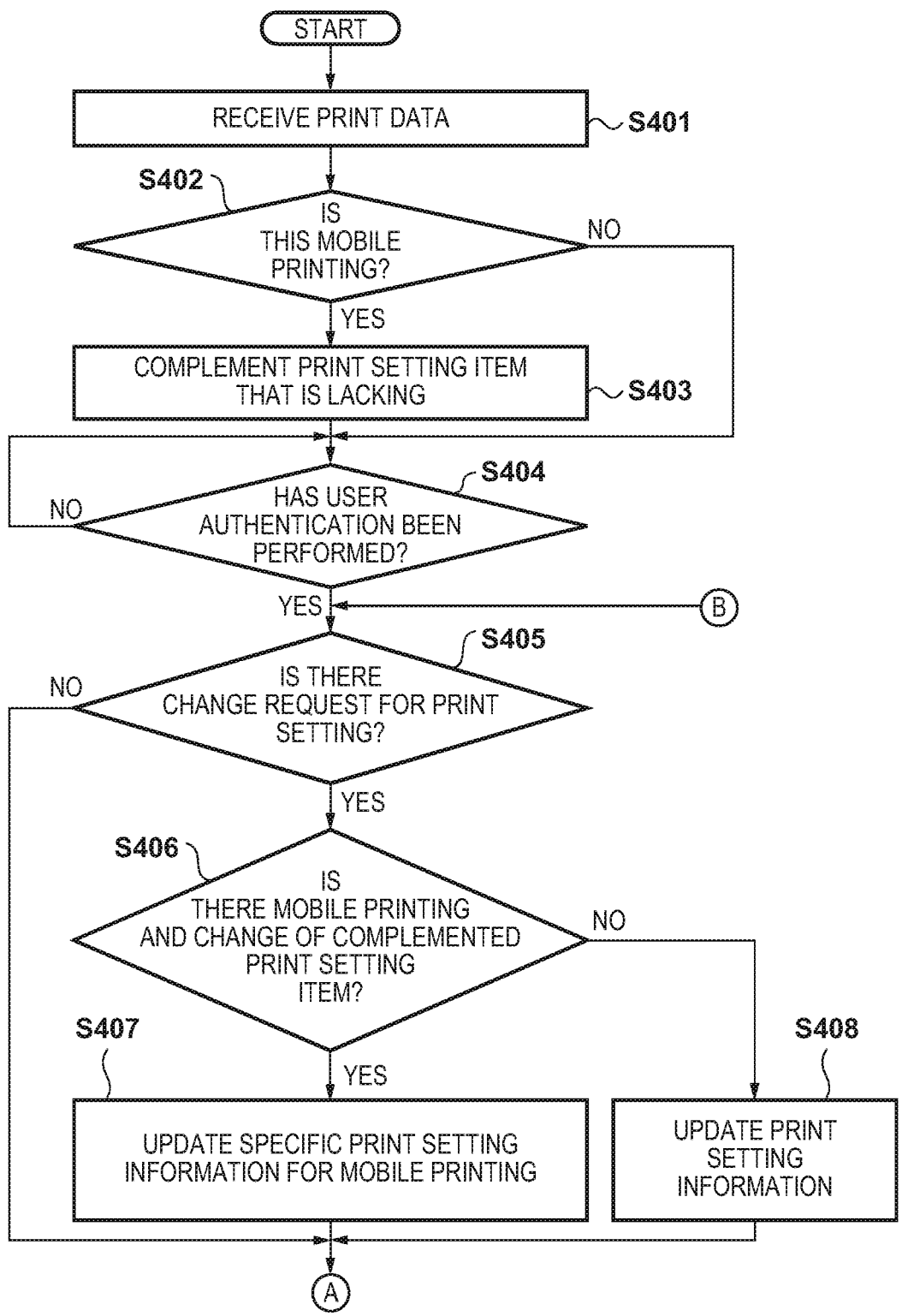
FIGS. 4A and 4B are flowcharts that illustrate a procedure for processing of the printing apparatus according to an embodiment.
Figure 4B:
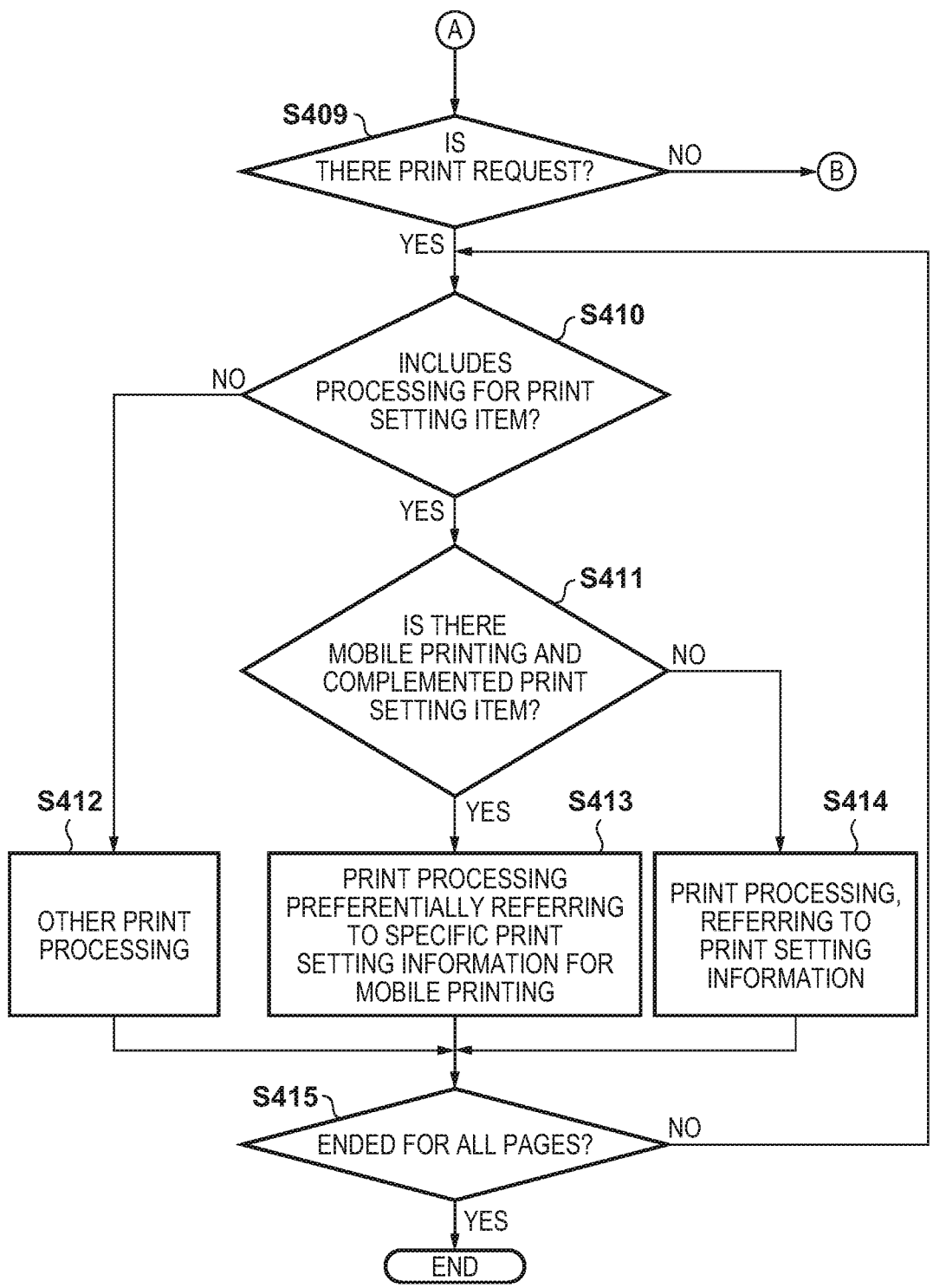

Next, referring to FIGS. 4A and 4B, description is given for a processing procedure in which the controller unit 100 in the present embodiment prints print data transmitted from a mobile terminal. The processing described below is realized by the CPU 101 of the printer 10 reading a control program stored in advance in the HDD 103, the ROM 107 or the like into the RAM 102, and executing the program, for example.

In step S401, the print data receiving unit 201 receives print data from an external apparatus such as a mobile terminal via the network I/F 104. Next, in step S402, the transmission determination unit 201a determines, in accordance with a parameter related to reception in step S401, whether the received print data is print data in accordance with mobile printing (a predetermined print type). In the case of mobile printing, the processing proceeds to step S403, otherwise the processing proceeds to step S404. In the present embodiment, the determination is for determining a print type, such for what kind of transmission source the printing is requested from, and for example is performed based on a communication protocol (the foregoing parameter relating to reception) for receiving print data, for example. In a case where print data is received by IPP (Internet Printing Protocol), mobile printing is determined, and in a case where the print data is received by a communication protocol other than IPP such as LDP (Line Printer Daemon), conventional PC printing is determined. Note that the present invention is not limited to this, and may determine a print type in accordance with the address of a transmission source, for example.

In step S403, the complementing unit 201b executes complementing processing based on a print setting included in the print data, and sets the print setting information 202a. In the present embodiment, if print data with print settings illustrated in FIG. 5B are received, the complementing unit 201b executes complementing processing, and sets values indicated by FIG. 6A to the print setting information 202a.

Firstly, for an item A (reference numeral 601a) of the print setting information 202a, it is also present in print data of FIG. 5B (reference numeral 501b). Accordingly, the complementing unit 201b sets the value of the item A (reference numeral 601a) of the print setting information 202a to be unchanged as "ON" for reference numeral 501b, and sets "no" which indicates that the value is not complemented for "complementing flag". Next, an item B (reference numeral 602a) and an item C (reference numeral 603a) of the print setting information 202a are not present in the print data of FIG. 5B (reference numerals 502b and 503b). Accordingly, the complementing unit 201b sets a predetermined value "OFF" for the "value" of the item B (reference numeral 602a) and the item C (reference numeral 603a) of the print setting information 202a, and sets "yes" indicating that a value has been complemented for a "complementing flag".

Next, in step S404, the controller unit 100 determines whether user authentication has been performed. If user authentication has been performed the processing proceeds to step S405, and if user authentication has not been performed the processing of step S404 repeats. In step S405, the print setting unit 202 determines whether a request to change a print setting for print data has been accepted from the user. If a change request has been accepted the processing proceeds to step S406, and if a change request has not been accepted the processing proceeds to step S409. Accepting a change request is performed via the operation unit 105 of the printer 10. In other words, the operation unit 105 is an example of an acceptance unit.

In step S406, the print setting unit 202 determines whether a target of a print setting change is print data in accordance with mobile printing, and whether what is to be changed is a print setting item that was complemented in step S403. In the case where there is print data in accordance with mobile printing and what is changed is a complemented print setting item, the processing proceeds to step S407, and otherwise the processing proceeds to step S408. Here, a print setting item is, for example, a double-sided print setting, a toner economization setting, or a folding setting described by FIGS. 5A to 5C or the like.

In step S407, the print setting unit 202 updates the specific print setting information 202b which is dedicated to mobile printing, and the processing proceeds to step S409. For example, there is the print setting information 202a illustrated in FIG. 6A, and when a user instructs changing the print setting item C to "ON", the specific print setting information 202b which is dedicated for mobile printing is updated as illustrated by FIG. 6B, and the value of the item C is set to "ON". What is updated is only the specific print setting information 202b, and the print setting information 202a is not updated.

In contrast, in step S408, the print setting unit 202 updates the print setting information 202a, and the processing proceeds to step S409. For example, there is the print setting information 202a illustrated in FIG. 6A, if the user makes an instruction to change the print setting item A to "OFF", the value of the item A of the print setting information 202a is set to "OFF" (not shown).

In step S409, the controller unit 100 determines whether there is a print request with respect to print data from a user. If there is a print request, the processing proceeds to step S410, and if not the processing returns to step S405. A print request indicates a request to instruct the start of printing, for example. In step S410, the print processing unit 203 determines whether processing to be performed with respect to print data includes print setting item processing. Here, the print setting item processing indicates setting items that can be set by the dedicated driver printing indicated by FIG. 5A, for example. In other words, if settings related to the print setting item included in FIG. 5A are included the processing proceeds to step S411, and otherwise the processing proceeds to step S412. In step S411, the print processing unit 203 determines whether a print target is print data in accordance with mobile printing, and whether what is to be processed is a print setting item that was complemented in step S403. In the case where there is print data in accordance with mobile printing and what is to be processed is a complemented print setting item, the processing proceeds to step S413, and otherwise the processing proceeds to step S414.

In step S412, the print processing unit 203 executes print processing other than for a print setting item, and the processing proceeds to step S415. In contrast, in step S413, when performing processing for a corresponding print setting item, the print processing unit 203 preferentially refers to the specific print setting information 202b that is dedicated to mobile printing, executes print processing and the processing proceeds to step S415. In contrast, in step S414, when performing processing for a corresponding print setting item, the print processing unit 203 refers to the print setting information 202a, executes print processing and the processing proceeds to step S415.

In relation to step S413 and step S414, description is given for a case where there is the print setting information illustrated in FIG. 6A and the specific print setting information dedicated to mobile printing that is illustrated in FIG. 6B. The "complementing flag" of the item A (reference numeral 601a) of the print setting information of FIG. 6A is set to "no". In such a case, the print processing unit 203 refers to the "value" of the item A (reference numeral 601a) of the print setting information, and executes print processing with the setting "ON" for the print setting item A. In addition, the "complementing flag" of the item C (reference numeral 603a) of the print setting information of FIG. 6A is set to "yes". In such a case, the print processing unit 203 refers to the "value" of the item C (reference numeral 603b) of the specific print setting information that is dedicated to mobile printing of FIG. 6B, and executes print processing with the setting "ON" for the print setting item C. Similarly the "complementing flag" of the item B (reference numeral 602a) of the print setting information of FIG. 6A is set to "yes". Accordingly, the print processing unit 203 refers to the item B (reference numeral 602b) of the specific print setting information which is dedicated to mobile printing of FIG. 6B, but there is no setting value under "value". In such a case, the print processing unit 203 refers to the "value" of the item B (reference numeral 602a) of the print setting information, and executes print processing with the setting "OFF" for the print setting item B.

In step S415, the print processing unit 203 determines whether processing for all pages of the print data has ended. When processing for all pages has ended the series of print processing for print data ends, and otherwise the processing returns to step S410, and the print processing continues.

As described above, the printing apparatus according to the present embodiment receives, from an external apparatus, print data including a first print setting, and, for the received print data, determines a print type from parameters relating to the reception. In addition, the present printing apparatus acquires a second print setting which is a specific print setting corresponding to the determined print type, and executes print processing using print data, in accordance with whether there is a first print setting or a second print setting for each setting item. In this way, the printing apparatus according to the present embodiment executes print processing in accordance with a print setting for a print setting item that can be set by a mobile terminal, and in accordance with a print setting of the printing apparatus for a print setting item that cannot be set by the mobile terminal. By this, a user can make an arbitrary setting at the printer for a print setting item that cannot be set by a mobile terminal, and convenience for mobile printing increases. In other words, by virtue of the present embodiment, it is possible to suitably select, for each print setting item, between a print setting item set via a mobile terminal and a print setting item defined in advance, while suppressing consumption of memory resources in the mobile terminal.

Second Embodiment

Below, description will be given for a second embodiment of the present invention. In the first embodiment described above, description is given for control of a print setting item by an application for mobile printing. In the present embodiment, description is given regarding control of printing using a general-purpose printer driver (hereinafter referred to as a general-purpose driver) installed on a PC or the like. Similarly to with mobile printing, for a general-purpose driver there is a limit to print setting items that can be set, in comparison to a dedicated printer driver for a specific printer or the like.

<Print Sequence Using General-Purpose Driver>

Firstly, with reference to FIG. 8, description is given for a sequence that illustrates an overall flow of the present embodiment in printing that uses a general-purpose driver (hereinafter referred to as general-purpose driver printing) that broadly supports a plurality of printers.

In step S801, a general-purpose driver, which is installed in an information processing apparatus such as a PC, acquires user information that can be used for authentication with the printer 10. Next, in step S802, the general-purpose driver makes a print setting with respect to print data. Next, in step S803, the general-purpose driver transmits print data to the printer 10. The print data includes user information acquired in step S801 or a print setting set in step S802.

Next, in step S804, the printer 10 receives print data transmitted from a PC. Next, in step S805, the printer 10 complements the print setting based on the print setting included in the print data. Similarly to mobile printing in the first embodiment above, a general-purpose driver does not support detailed print settings as with a dedicated driver, and a user can only set limited print setting items. Accordingly, similarly to the first embodiment described above, by executing processing for complementing a print setting, print processing that follows the intention of a user is realized.

FIG. 5C is a conceptual view of print settings included in print data generated by a general-purpose driver. Print setting items present in the print data are the item A and the item B, and a user cannot set the item C by the general-purpose driver. Setting details for each item are similar to the details described in the first embodiment above.

FIGS. 10A and 10C respectively illustrate examples of a print setting screen for a dedicated driver and a print setting screen for a general-purpose driver. In addition to basic print settings such as "sheet size" or "simplex/duplex printing", the general-purpose driver can also set optional print settings such as "toner economization" (do not economize=OFF, and economize=ON). However, because there are limitations on products that support the special print setting "folding setting" (do not fold=OFF, and fold=ON) for optionally folding an output sheet by a dedicated device, it cannot be set by the general-purpose driver. In view of this, similarly to the first embodiment described above, the printer 10 executes processing for complementing by the printer's own information for the print setting item. In the present embodiment, the item C of FIG. 5C is complemented by the predetermined value "OFF".

Figure 8:
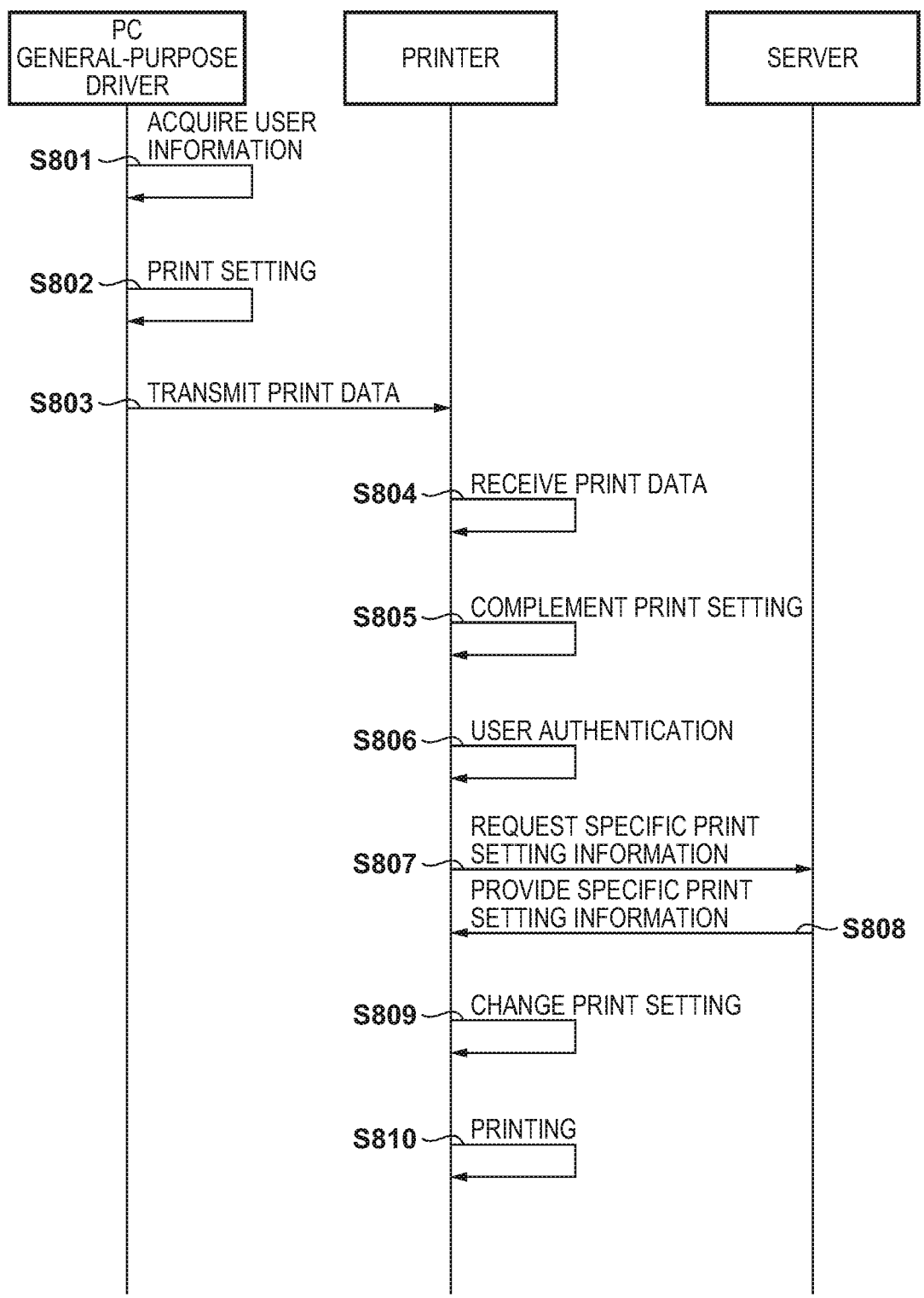
FIG. 8 illustrates an overall sequence of the printing apparatus according to an embodiment.

The description of FIG. 8 is returned to. In step S806, the printer 10 performs user authentication. Next, in step S807, the printer 10 requests a server to which it is communicably connected via the network for specific print setting information for the user authenticated in step S806. In the present embodiment, it is assumed that there is specific print setting information for all users who use the printer 10 in the server.

Next, in step S808, the server provides the requested specific print setting information for the user to the printer 10 which is the request source. Next, in step S809, the printer 10 changes a print setting for the print data in accordance with, for example, a change request from a user. Furthermore, in step S810, the printer 10 prints the print data in accordance with the print settings at that point, and this sequence ends.

<Processing Procedure for the Printer>

Figure 9A:
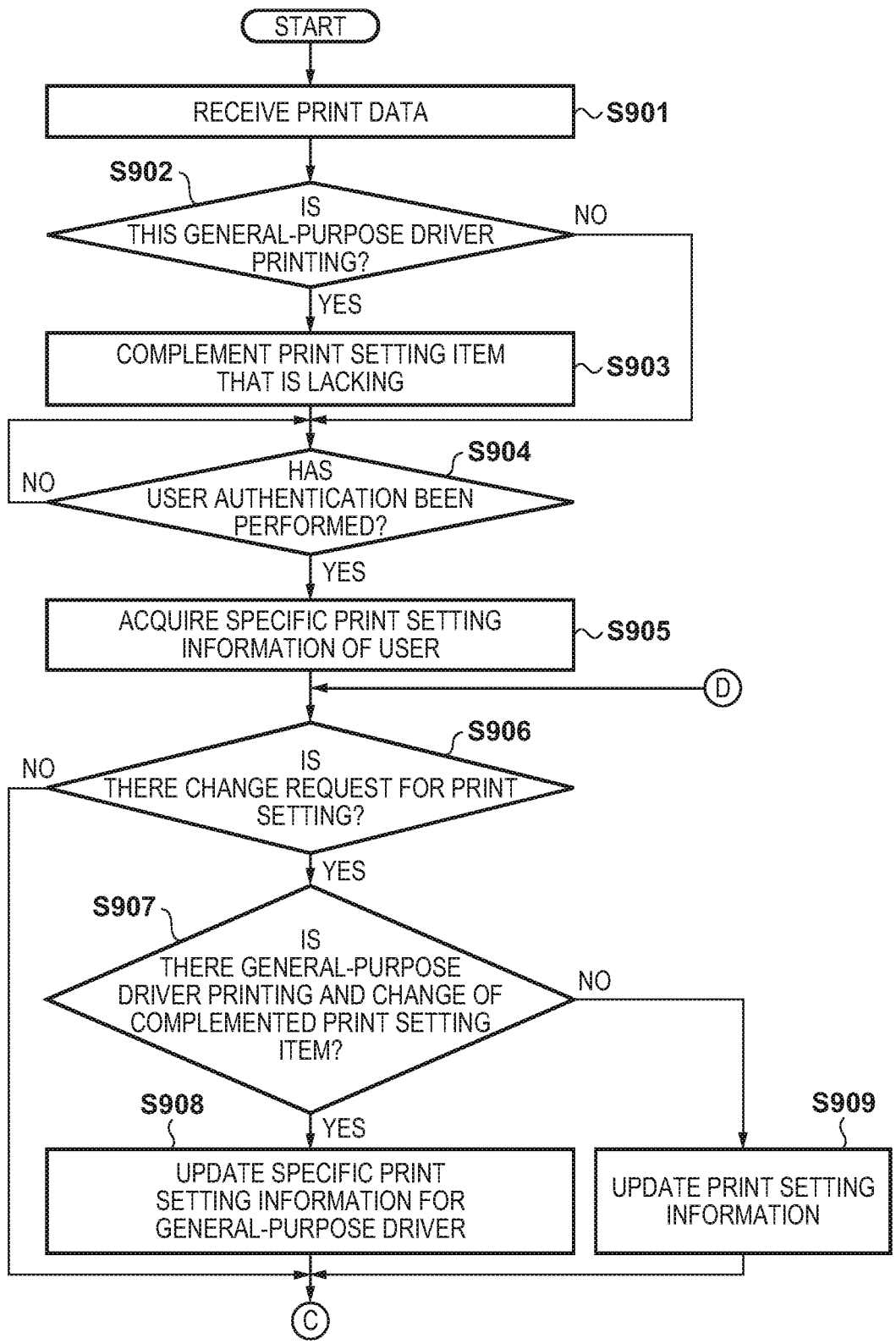
FIGS. 9A and 9B are flowcharts that illustrate a procedure for processing of the printing apparatus according to an embodiment.
Figure 9B:
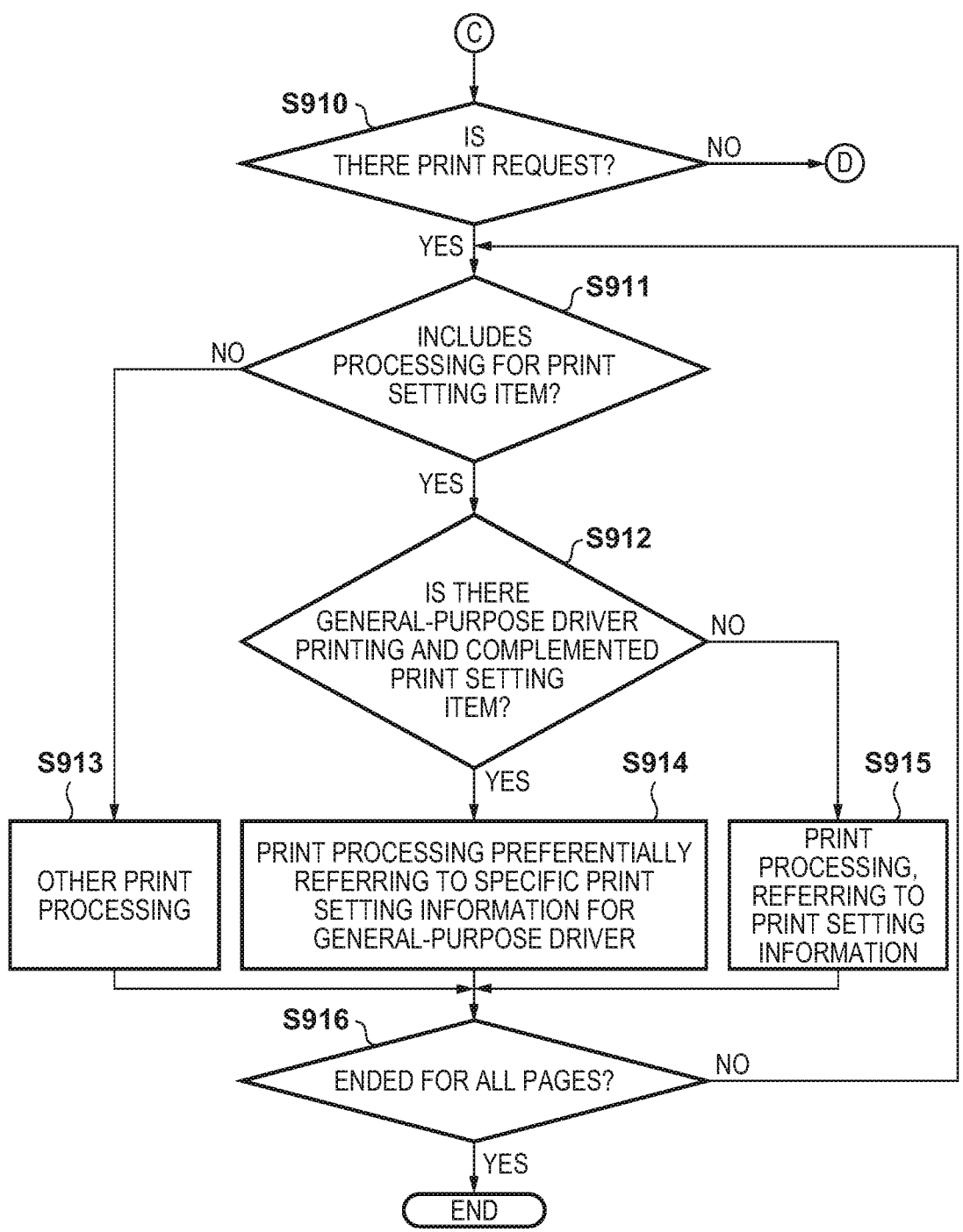

Next, referring to FIGS. 9A and 9B, description is given for a processing procedure in which the controller unit 100 in the present embodiment prints print data transmitted from a general-purpose driver. The processing described below is realized by the CPU 101 of the printer 10 reading a control program stored in advance in the HDD 103, the ROM 107 or the like into the RAM 102, and executing the program, for example.

In step S901, the print data receiving unit 201 receives print data from an external apparatus such as a PC via the network I/F 104. Next, in step S902, the transmission determination unit 201a determines whether the received print data is print data in accordance with general-purpose driver printing (a predetermined print type). In the case of general-purpose driver printing, the processing proceeds to step S903, otherwise the processing proceeds to step S904. In the present embodiment, this determination is for determining a print type in accordance with what transmission source (driver type) requested printing. For example, it is assumed that the print data includes driver version information, and it is possible to determine, by the version information, whether there is conventional PC printing or general-purpose driver printing.

In step S903, the complementing unit 201b executes complementing processing based on the print setting included in the print data, and sets the print setting information 202a. In the present embodiment, if print data with print settings illustrated in FIG. 5C are received, the complementing unit 201b executes complementing processing, and sets values indicated by FIG. 7A to the print setting information 202a. Because the setting method is similar to that in the first embodiment described above, description is omitted.

Next, in step S904, the controller unit 100 determines whether user authentication has been performed. If user authentication has been performed the processing proceeds to step S905, and if user authentication has not been performed the processing of step S904 repeats. In step S905, the print setting unit 202 acquires, from the server, specific print setting information for the user who authenticated in step S904, and sets it to the specific print setting information 202b. In step S906, the print setting unit 202 determines whether a request to change a print setting for print data has been accepted from the user. If a change request has been accepted the processing proceeds to step S907, and if a change request has not been accepted the processing proceeds to step S910.

In step S907, the print setting unit 202 determines whether a target of a print setting change is print data in accordance with general-purpose driver printing, and whether the print setting item to change is an item that was complemented in step S903. In the case where there is print data in accordance with a general-purpose driver and where a setting item to change is a complemented item, the processing proceeds to step S908, and otherwise the processing proceeds to step S909.

In step S908, the print setting unit 202 updates the specific print setting information 202b which is for general-purpose driver printing, and the processing proceeds to step S910. For example, there is the print setting information 202a illustrated in FIG. 7A, and if a user requests to change a print setting item C (reference numeral 703a) to "ON", the following update is performed. The specific print setting information 202b for the general-purpose driver is updated as illustrated by FIG. 7B, and the "value" of the item C (reference numeral 703b) is set to "ON". What is updated is only the specific print setting information 202b, and the print setting information 202a is not updated.

In contrast, in step S909, the print setting unit 202 updates the print setting information 202a, and the processing proceeds to step S910. For example, there is the print setting information 202a illustrated in FIG. 7A, if the user makes an instruction to change the print setting item A (reference numeral 701a) to "OFF", the value of the item A of the print setting information 202a is set to "OFF" (not shown).

In step S910, the controller unit 100 determines whether there is a print request with respect to print data from a user. If there is a print request, the processing proceeds to step S911, and if not the processing returns to step S906. A print request indicates a request to instruct the start of printing, for example. In step S911, the print processing unit 203 determines whether processing to be performed with respect to print data includes print setting item processing. Here, print setting item processing indicates setting items that can be set by the dedicated driver printing indicated by FIG. 5A, for example. In a case of including processing for a print setting item, the processing proceeds to step S912, and otherwise the processing proceeds to step S913. In step S912, the print processing unit 203 determines whether a print target is print data in accordance with general-purpose driver printing, and whether what is to be processed is a print setting item that was complemented in step S903. In the case where there is print data in accordance with general-purpose driver printing and what is to be processed is a complemented print setting item, the processing proceeds to step S914, and otherwise the processing proceeds to step S915.

In step S913, the print processing unit 203 executes print processing other than for a print setting item, and the processing proceeds to step S916. In contrast, in step S914, when performing processing for a corresponding print setting item, the print processing unit 203 preferentially refers to the specific print setting information 202b that is for a general-purpose driver, executes print processing and the processing proceeds to step S916. Because the reference method is similar to that in the first embodiment described above, description is omitted. In contrast, in step S915, when performing processing for a corresponding print setting item, the print processing unit 203 refers to the print setting information 202a, executes print processing and the processing proceeds to step S916.

In step S916, the print processing unit 203 determines whether processing for all pages of the print data has ended. When processing for all pages has ended the series of print processing for print data ends, and otherwise the processing returns to step S911, and the print processing continues.

As described above, in general-purpose driver printing, the printing apparatus according to the present embodiment executes processing for complementing a print setting item that is similar to that for mobile printing in the first embodiment above. By this, the printing apparatus according to the present embodiment executes print processing in accordance with a print setting for a print setting item that can be set by a general-purpose driver, and in accordance with a print setting of the printing apparatus for a print setting item that cannot be set by the general-purpose driver. By this, a user can make an arbitrary setting by a printing apparatus for a print setting item that cannot be set by a general-purpose driver. In other words, by virtue of the present embodiment, it is possible to suitably select, for each print setting item, between a print setting item set via a PC and a print setting item defined in advance, while suppressing consumption of a memory resource by the PC. In addition, because specific print setting information is prepared for each user in the present embodiment, a user who sets a print setting once at the printer does not need to set the print setting again for subsequent printing, and convenience further increases.

Note that, in the present embodiment, configuration was taken to acquire specific print setting information from a server, but configuration may be taken to use specific print setting information that is stored in advance in a memory or the like of the self-apparatus, similarly to in the first embodiment above. On the other hand, in the first embodiment described above, configuration may be taken to acquire the specific print setting information from a server, similar to in the present embodiment. In a case of a configuration for acquiring information from a server, it is possible to take advantage of abundant memory resources, and therefore the specific print setting information can be set for each user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-038966 filed on Mar. 5, 2018, which is hereby incorporated by reference herein in its entirety.

What is claimed is:

1. A printing apparatus comprising:
a storage configured to store information for activating a predetermined setting for print data received from an external apparatus; and
at least one processor configured to execute:
receiving print data from the external apparatus;
activating the predetermined setting for the received print data based on the stored information;
receiving a user operation for changing the predetermined setting activated for the received print data; and
executing a printing process based on the received print data for which the predetermined setting has been changed.

2. The printing apparatus according to claim 1, wherein the predetermined setting is a setting which the external apparatus cannot activate.

3. The printing apparatus according to claim 1, wherein the information is stored, in the storage, before receiving the print data.

4. The printing apparatus according to claim 1, wherein the storage stores the information in association with the user, and
the at least one processor is configured to execute:
selecting the information stored in the storage and in association with the user logged in the printing apparatus, and
executing the printing process based on the print data for which the determined setting is activated.

5. The printing apparatus according to claim 1,
wherein the user operation for changing the predetermined setting activated for the received print data is a user operation for deactivating the predetermined setting.

6. The printing apparatus according to claim 1,
wherein the at least one processor applies the predetermined setting to the received print data in a case where the print data has been received with a predetermined protocol.

7. The printing apparatus according to claim 6,
wherein the predetermined protocol is an IPP (Internet Printing Protocol).

8. The printing apparatus according to claim 1,
wherein the print data includes a print setting different from the predetermined setting.

9. The printing apparatus according to claim 1,
wherein the predetermined setting is a setting for folding a sheet on which an image based on the print data has been printed.

10. The printing apparatus according to claim 1,
wherein the at least one processor accepts another user operation for starting a printing process, and
starts a printing process based on the received print data in accordance with the another user operation.

11. A method of controlling a printing apparatus, the method comprising:

storing, in a storage, information for activating a predetermined setting for print data received from an external apparatus;

receiving print data from the external apparatus;

activating the predetermined setting for the received print data based on the stored information;

receiving a user operation for changing the predetermined setting activated for the received print data; and executing a printing process based on the received print data for which the predetermined setting has been changed.

12. A printing apparatus comprising:

a storage configured to store information for adding a print setting to be used for processing print data received from an external apparatus; and at least one processor configured to execute:

receiving print data from the external apparatus;

storing the received print data;

receiving a user operation for changing the print setting to be used for processing the print data which has been stored; and executing a print process based on the stored print data and the changed print setting.

13. The printing apparatus according to claim 12, wherein the at least one processor adds the print setting based on the information in a case where the print data has been received with a predetermined protocol.

14. The printing apparatus according to claim 13, wherein the predetermined protocol is an IPP (Internet Printing Protocol).

15. The printing apparatus according to claim 12, wherein the print data includes a print setting different from the predetermined setting.

16. The printing apparatus according to claim 12, wherein the predetermined setting is a setting for folding a sheet on which an image based on the print data has been printed.

17. The printing apparatus according to claim 12, wherein the at least one processor accepts another user operation for starting a printing process, and starts a printing process based on the received print data in accordance with the another user operation.

18. The printing apparatus according to claim 12, wherein the print setting is a setting which the external apparatus cannot activate.

* * * * *